United States Patent [19]

Kamiya et al.

[11] Patent Number: 5,751,228
[45] Date of Patent: May 12, 1998

[54] GUIDE SYSTEM

[75] Inventors: Kazuo Kamiya, Anjo; Hirofumi Morimoto, Nishio; Shoji Yokoyama, Anjo, all of Japan

[73] Assignees: Aisin AW Co., Ltd.; Equos Research Co., Ltd., both of Japan

[21] Appl. No.: 405,967

[22] Filed: Mar. 17, 1995

[30] Foreign Application Priority Data

| May 2, 1904 | [JP] | Japan | 6-093467 |
| Mar. 18, 1994 | [JP] | Japan | 6-049237 |
| May 2, 1994 | [JP] | Japan | 6-093466 |

[51] Int. Cl.$^6$ ................................ G08G 1/123
[52] U.S. Cl. .................. 340/988; 340/990; 340/995; 364/443; 364/449.5; 43/178 R
[58] Field of Search ....................... 340/995, 990, 340/988; 364/449, 44, 443, 449.5; 73/178 R

[56] References Cited

U.S. PATENT DOCUMENTS

| 4,630,209 | 12/1986 | Saito et al. | 340/995 |
| 4,761,742 | 8/1988 | Hanabusa et al. | 340/988 |
| 4,812,845 | 3/1989 | Yamada et al. | 360/988 |
| 4,951,211 | 8/1990 | Devilloroche | 340/995 |
| 5,293,163 | 3/1994 | Kakihara et al. | 340/988 |
| 5,412,573 | 5/1995 | Barnea et al. | 340/990 |
| 5,442,557 | 8/1995 | Kanoko | 340/990 |

*Primary Examiner*—Jeffery Hofsass
*Assistant Examiner*—Benjamin C. Lee
*Attorney, Agent, or Firm*—Lorusso & Loud

[57] ABSTRACT

A guide system gives sight-seeing guidance for various sight-seeing objects located within a wide area without an interval of pause. The guide system includes guide data storage wherein guide data, for showing objects located along the travelled road, and for showing streets and other objects in the local area, is classified into types and stored. A guide information output section outputs guidance information pertaining to an object, located by search, having sight-seeing interest. A position detector detects and traces the current position. Further, the guide system has a plurality of search mechanisms, each of which searches only within a specific category of guide objects and only within an area defined at least in part by the current position, as identified by the current position detector. The guide system searches for and extracts information for an object from the guide data storage and outputs the information pertinent thereto. It is possible to limit each search to guide objects within a given classification and to search them in order of priority. The guide system extracts the highest priority object first by use of one or more of the search mechanisms and then extracts additional objects in the same order of priority and outputs guidance information therefor, to eliminate any interval of pause in which no guidance is output.

10 Claims, 14 Drawing Sheets

Inverse

Remote controller

Correction

Remote controller

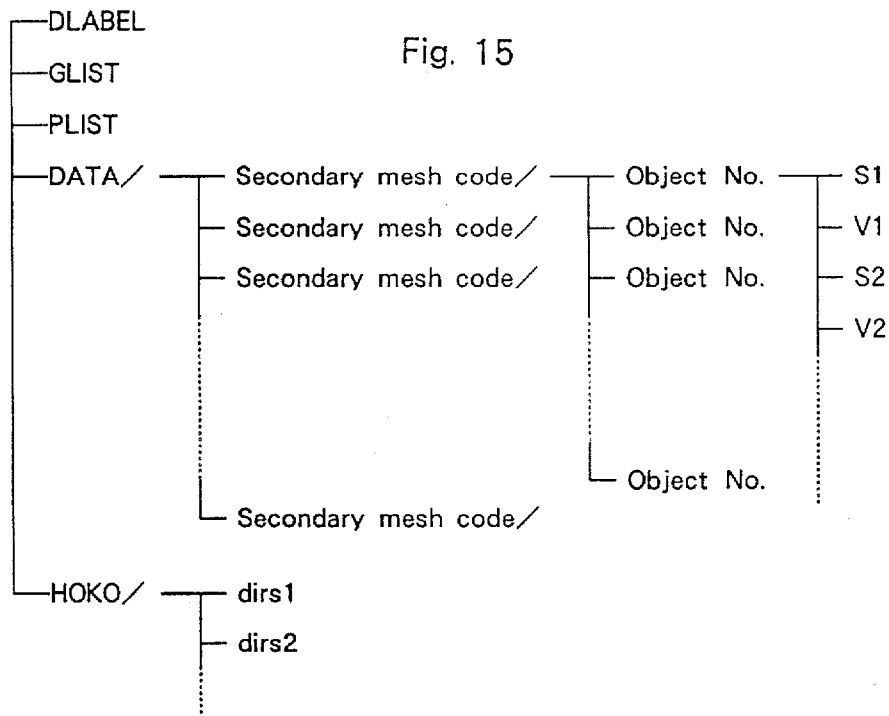
Fig. 15
Fig. 16
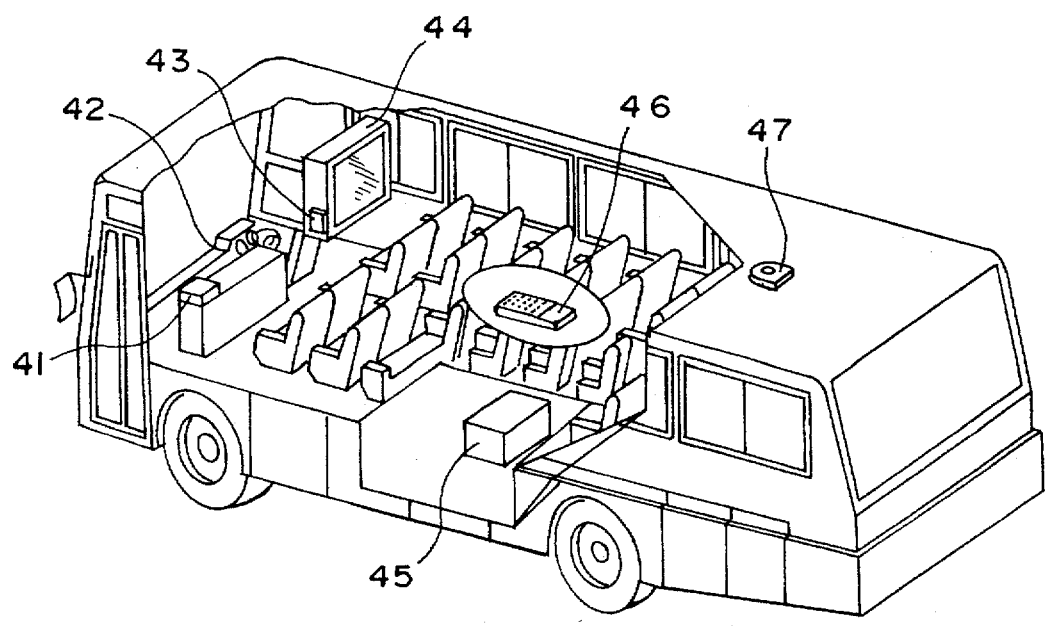

GUIDE SYSTEM

BACKGROUND OF THE INVENTION

1. Field of the Invention

The present invention relates to a guide system for tracing the current position of a vehicle in order to provide sight-seeing information pertaining to objects and features of tourist interest located in the vicinity of the road on which the vehicle is travelling.

2. Description of the Prior Art

A variety of navigation systems for selecting an optimum route and guiding a vehicle along the selected route to a destination, responsive to input of a start point (current location) and a destination, have been proposed. Most conventional navigation systems do nothing but guide a vehicle to a destination by instructing direction for a turn (right or left turn) and traveling direction, by reference to intersections and distinctive features such as landmarks; however systems capable of giving sight-seeing information have been also proposed.

For example, Japanese Patent Application Laid-Open No. SHO 61-290473, Japanese Patent Publication No. SHO 63-19005 and Japanese Patent Application Laid-Open No. HEI4-1520 disclose apparatus which comprises a memory means for storing sight-seeing information, and which detects the current location of a vehicle, displays a map with the current location of the vehicle and traveling direction shown thereon, and audibly outputs sight-seeing information or the like. Additionally, a guidance system that uses a visual display image, instead of audio output, has been also disclosed. Further, Japanese Patent Application Laid-Open No. HEI4-1898 discloses an audio guidance system capable of selecting a phrase of a sight-seeing information sentence to be audibly output from memory within a time calculated according to vehicle speed. The sight-seeing guide sentences are divided into phrases and stored in the memory with respective phrases in order of their assigned priority.

However, the aforementioned conventional guide systems are not capable of showing guide objects other than features located on roads because they are designed to search for and show a guide object located at a current position or on a road on which the vehicle is scheduled to travel, according to the detected position. Further, the conventional guide system is not capable of showing an object or feature which is located in the vicinity of a road on which the vehicle is traveling or scheduled to travel and the conventional system starts the guidance when the vehicle has arrived at the point at which the object or feature is located. Therefore, if guide objects are dispersed over a wide area and particularly if there is no guide object over a long distance, the conventional system provides no information for a period of time. Although the conventional system can show guide objects having addresses in memory, it is not capable of providing information about, for example, a road on which the vehicle is currently traveling or area around the road.

SUMMARY OF THE INVENTION

Accordingly, an object of the present invention is to solve the aforementioned problems and to provide a guide system capable of providing appropriate sight-seeing information for various guide objects, e.g., landscape features and landmarks, over a wide area, without an interval of pause.

To achieve the foregoing object of the present invention, there is provided a guidance system including a guide data storing means in which guidance data for various guide objects located on a road, streets and objects existing in local area are classified by type and stored, guide information output means for outputting the guidance information for a guide object, current position detecting means for detecting and tracing the current position, and guidance output means for searching for and extracting from memory guidance data relating to an object from the guide data storing means and outputting guidance therefor. The guidance output means has a plurality of search means for searching for guide objects according to a priority based on their classification and on the basis of the current position obtained from the current position detecting means.

With the above-described guidance system, it is possible to search for guide objects on different levels of priority. Further, because, according to the present invention, a plurality of search means are each assigned to a given level in a hierarchy of priority and, according to the order of priority, sequentially perform searching to extract from memory data for guide objects and further because the guide objects are classified as point objects, linear objects and zone objects and assigned priority in this order and the guide objects are searched according to the respective types, it is possible to search and extract, in sequence, the guidance data for a guide object having the highest priority and to output the guidance therefor. Still further, in the case where point objects are dispersed over a wide area and particularly when there is no point object to be encountered over a long distance, it is possible to eliminate any interval of pause in which no guide object is shown.

BRIEF DESCRIPTION OF THE DRAWINGS

FIG. 15 shows an example of a file configuration of a guide CD.

FIG. 16 illustrates a vehicle incorporating the guidance system of the present invention.

DETAILED DESCRIPTION OF THE PREFERRED EMBODIMENTS

Embodiments of the present invention will be described with reference to the accompanying drawings.

Figure 1:
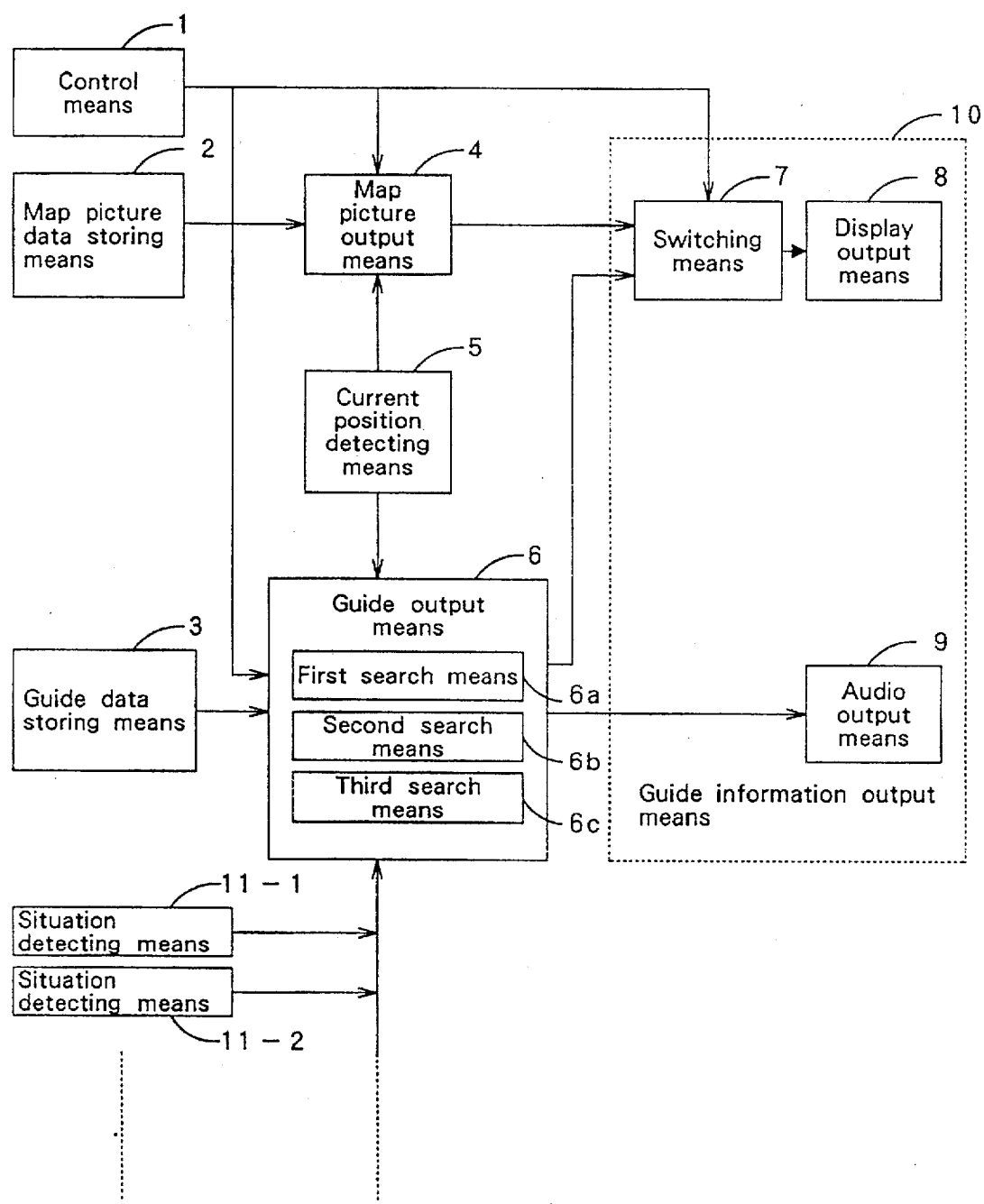
FIG. 1 is a block diagram of an embodiment of the guidance system according to the present invention.
Figure 7:
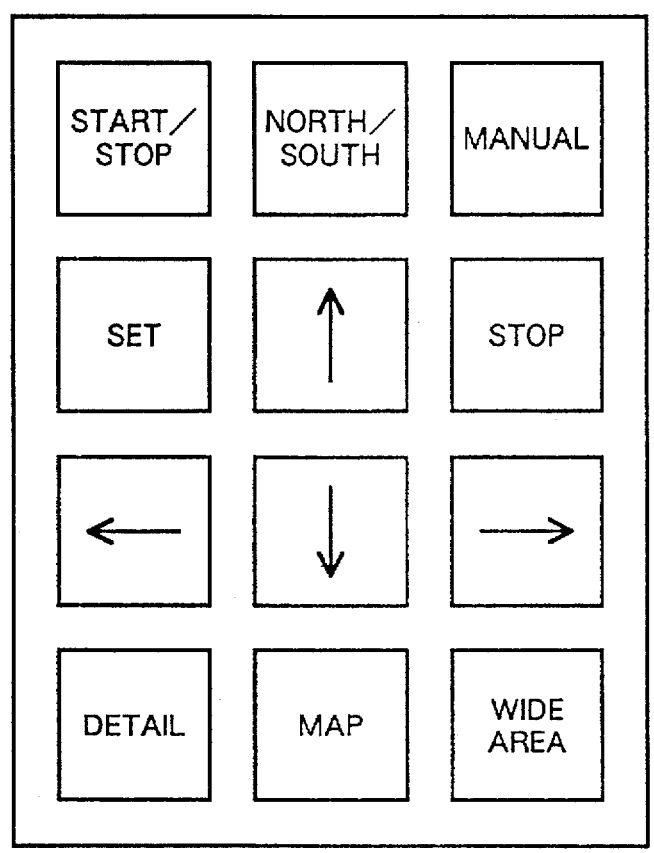
FIG. 7 shows an example of a keypad which may be used as the control means.

Referring to FIG. 1, a control means 1 has keys for magnifying a map picture displayed on a display output means 8 to a detailed map, reducing a map picture to a wide area map, switching the direction of the map by, for example, changing the display direction from the north at the top of the displayed map to the south at the top and switching the display content from a guide image to a map picture. For this purpose, for example, a remote control unit having manual keys as shown in FIG. 7 is used. The display output means 8 is used for visually outputting the images of guide objects (e.g. landmarks) and map pictures. An audio output means 9 is used for audibly outputting information pertaining to a guide object or landscape feature. A map picture data storing means 2 stores the map picture data about roads divided into grids and guide objects and features. A guide data storing means 3 stores visual and audio guide data concerning guide objects, e.g. landmarks, located on roads, streets and other area features, classified according to the type of the feature or object. The guide objects are classified based upon duration of guide information suitablity for which guidance can start during vehicle movement such as point features identifiable by a set of coordinates spread over a small area to 20–30 meters across, linear features such as roads, and wide zone features such as a city, town, village, plain, basin, specific area, national park or the like.

Further, it is permissible to divide the guide data for each guide object into a plurality of short guide units (phrases) and then to store them as guide units organized in accordance with a set priority. A current position detecting means 5 detects the north or south latitude, east or west longitude, a current position on the road on which the vehicle is currently travelling, advancement direction, vehicle speed and the like and, for this purpose, employs a GPS (global positioning system) receiver unit, a vehicle speed sensor, a steering angle sensor, a gyro sensor, terrestrial magnetism sensor or the like. A map picture output means 4 reads map picture data for the area around the current position from the map picture data storing means 2 and outputs the map picture and indicator of advancement direction. A guide output means 6 extracts guide data for a guide object from the guide data storing means 3, in accordance with information such as current position, advancement direction, vehicle speed, road identification or the like and converts the guide data to video signals and audio signals for output. When the guidance data for the next guide object is extracted from memory during current guidance, that is, during output of guide data relevant to current guide object, the current guidance may be canceled at the end of the currently-output guide unit and guidance data for the next object is started. Further, when guidance data for the next guide object is extracted from memory, it is compared with the guidance data for the object currently shown in terms of order of priority. If the next guide object has a higher priority, guidance to the next guide object is started and the guide object which has already been processed or shown can be registered as an already-shown object in order to prevent the same object from being shown again.

The guidance output means 6 has a first search means 6a, second search means 6b and third search means 6c. It is possible to assign different searches for these search means 6a, 6b, 6c by, for example, making the first search means 6a search the aforementioned point objects, the second search means 6b search the aforementioned linear objects, and the third search means search the aforementioned zone objects. Further, it is possible to operate these search means according to a pre-assigned order of priority or to switch the order of priority by operating a manual key of the control means 1.

A switching means 7 switches the display output from the display output means 8 between a map picture from the map picture output means 4 and a guide image from the guide output means 6, and indicates current position and advancement direction on a displayed map picture. When data for a guide object is extracted from memory during the travel of the vehicle, visual and audio guidance is then started, the map picture display signal being switched to a guide video signal from the guide output means 6. However, if the map display key of the control means 1 is operated, the guide image is switched to a corresponding map picture.

Situation detecting means 11-1, 11-2, . . . determine the situation of the vehicle, and include a calendar for determining the season, a clock for determining time, a thermo-hygrometer for detecting temperature and humidity, a rainfall sensor for detecting weather conditions, such as rain or snow, a traffic congestion receiver for receiving traffic congestion information and the like.

The guide output means 6 may search for a guide object stored in the guide data storing means 3 according to the information such as current position, advancement direction, vehicle speed, road condition or the like which are entered from the current position detecting means 5. Further, the guide output means 6, may arrange output data by editing a guide sentence according to situations detected by the situation detecting means 11-1, 11-2, . . . , and convert the arranged output data into guide video signals and audio output signals.

Guide information output means 10 according to the present invention includes the switching means 7, the display output means 8 and the audio output means 9.

The guidance system of the present invention is supplied with power to display a title picture on the screen of the display output means when the ACC is ON, and is powered off when the ACC is OFF. If a CD-ROM storing a program is already selected when the power is turned on, the program is started. However, if a CD-ROM is selected after the power is turned on, the program is started by operation of the control means 1. When the guide program is started, the current position is detected and traced continually as the vehicle travels, so that a map picture with the current position approximately at the center thereof is displayed with the north at the top and an arrow is displayed to indicate the advancement direction. After data for a guide object is extracted from the guide data storing means 3, by searching according to the current position, traveling direction and vehicle speed, the extracted guide data is output.

As described above, the guide objects are classified into: point objects such as facilities, buildings and monuments; linear objects such as bridges, streets, lakes and large scale facilities having a large length or width; and zone objects such as national parks, plains, and other regional feature. The timing for starting guidance related to point objects is rather restricted, whereas the timing of starting guidance output for linear and zone objects can be selected within time ranges of some extent. Relatively, point objects come first in output priority, followed by line objects, and zone objects come last. Guidance related to linear objects and zone objects is allowed a relatively large latitude for output timing and, therefore, can wait until after guidance for a more important point object is completed. In search for a guide object, the point objects are first searched. If no appropriate point object is found, then the linear objects are searched. If no appropriate linear object is found, the zone objects are then searched. It is permissible to set a condition such that, in the event that no point object is initially found, the search of point objects continues for a predetermined length of time, then the linear objects and zone objects are searched sequentially. Further, it is permissible to set the system so that if a point object having higher priority is found during guidance related to a linear or zone object, the current guidance related to linear or zone object is canceled and guidance related to the point object is started. Further, it is permissible to have the system select a guide object by searching only the linear objects and/or the zone objects when manual guidance is selected by means of the control means 1.

Guidance is performed as follows. First, a guide object is extracted from the guide data storing means 3 in accordance with the current position, advancement direction, vehicle speed or the like. As the vehicle approaches the guide object, the guide output means 6 automatically extracts corresponding guide data and converts the guide data into picture and voice guidance. Guidance is not started until the guide output means 6 determines that all the following conditions are satisfied at the guidance start point set for the extracted guide object. A guidance starting point is preset or predetermined for each guide object stored in the guide data storing means 3. The conditions for starting guidance are: the travelling direction of a vehicle is within an angle $+A°$ relative to the advancement direction and extending from the guidance start point as the apex of the angle, as shown in FIG. 2a; vehicle position is within B meters from the guide point coordinate with the vehicle speed being considered; and no guide object or other object has been shown. Additionally, it is possible to perform guidance, that is output of guide data, for any one guide object in the vicinity of the current vehicle position (within $+A'°$ relative to the direction of advance from the guiding start point, the distance between the guide point and the current position being at most B'm, wherein $A'° \geq A°$, $B' \geq B$) by manually inputting an instruction using the control means 1.

Further, the first search means 6a of the guide output means 6 extracts guide data for a point object from the guide data storing means 3 according to the current location, advancement direction, vehicle speed and the like. When the vehicle approaches the guide object, the guide output means 6 automatically outputs the guide data for that object in the form of image and voice guidance, provided that guide object has not already been shown, and that no other guide object is being shown or if an object is being shown it is to be canceled because it is of a lower priority. This search area is a range in which the traveling direction of the vehicle is within $\pm A°$ with respect to the direction of vehicle advancement from the guide start point as shown in FIG. 2a and the vehicle position is located within B m from the guide start point as determined by the vehicle speed, as shown in FIG. 2b. If the first search means 6a does not extract data for any guide object, the second search means 6b and the third search means 6c extract any linear object and zone object from the guide data storing means 3 in accordance with the current location, and if the extracted guide object has not been shown and no other object is being shown, the guide output means 6 automatically outputs a corresponding guide image and voice. In searching for a linear object, for example, the road on which the vehicle is traveling is determined according to the current location and the guide objects are searched for with reference to the road. In searching zone objects, zone objects that cover the coordinates of the current location are retrieved. Thus, for the respective zone objects, the coverage is set and registered with a plurality of coordinate values by operating a manual key. The first search means 6a searches a wider area for guide objects and extracts guide objects located in the search range, as shown in FIG. 2(c), (range in which the vehicle traveling direction is within $A'°$ with respect to the advancement direction from the guide start point and the vehicle position is within B' m from the guide start point when the vehicle speed is considered, wherein $A'°>A°$, $B'>B$) near the current vehicle location. The extracted guide objects may be shown in order beginning with the object which is nearest to the current location or it is permissible to start guidance with a guide object which is nearer than any of the guide objects in sequence. For this purpose, it is permissible to add an auxiliary search means 6a'. Additionally, it is permissible to establish a priority for respective guide objects so as to show that guide object having the highest priority.

The criterion for guidance termination is basically that guide data being output has reached its end. However, when the guidance cancel switch of the control means 1 is operated or when the vehicle comes to another guide point, the next guide unit of the currently-shown guide object is compared with the leading guide unit for that guide object in terms of priority. If the leading guide unit of the next object in sequence has a higher priority than the next guide unit of the currently-shown object, the guidance for the current object is canceled at the end of the currently-output guide unit. To summarize, guide data for a single guide object comprises, for example, a plurality of guide units each having a single picture and voice lasting for several seconds. The guide system of the present invention determines at each guide unit whether guidance should be performed or canceled. Further, it is permissible to assign priority to the guide units so that, when a plurality of guide objects satisfy the conditions for start of guidance, selection of the guide objects for execution of guidance, adjustment of the length of guidance and cancellation thereof are determined according to the order of priority.

Figure 3:
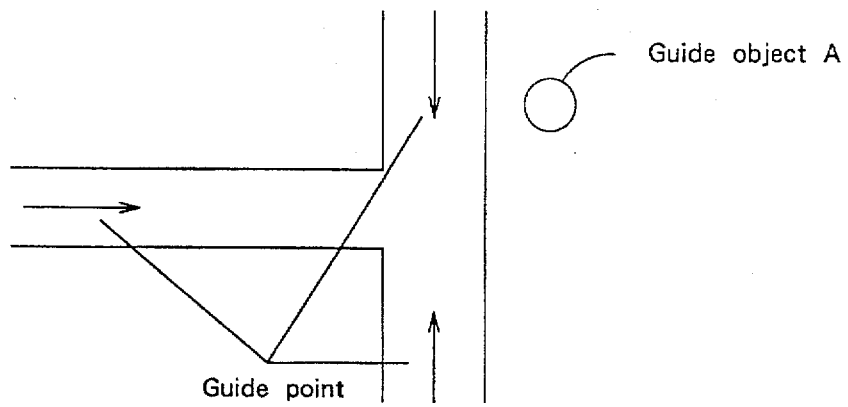
FIG. 3 illustrates guide points for a single object.
Figure 4:
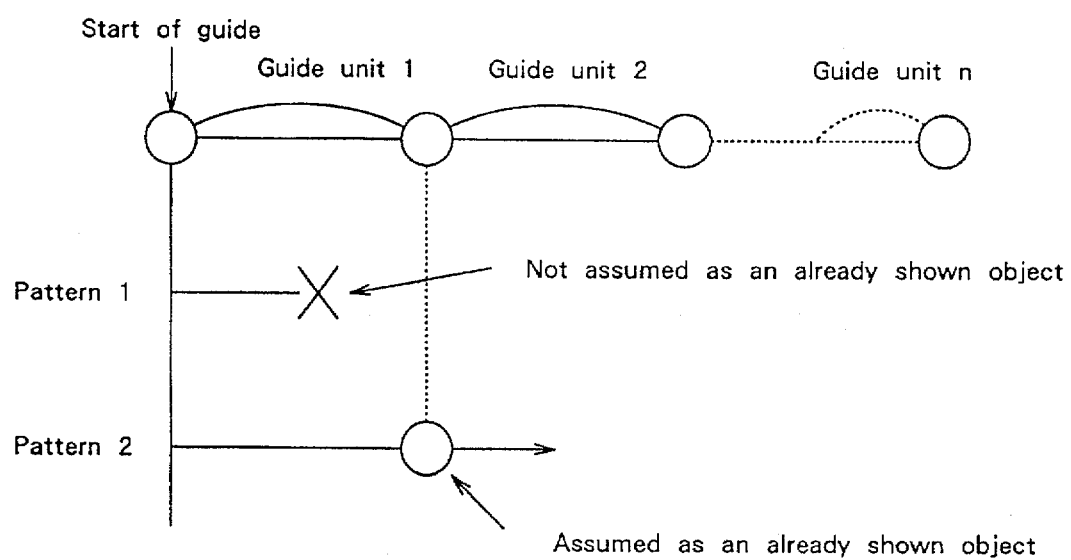
FIG. 4 illustrates selection of a guide object to be shown.

A plurality of guide points may be provided for a single guide object. For example, three guide points are provided in the vicinity of a T-shaped road, as shown in FIG. 3. Each guide point is identified by coordinates for longitude and latitude and the direction of advance of the vehicle. When the present position of the vehicle is determined to coincide with a guide point, guidance relating to the corresponding guide object is initiated.

An object which has already been shown is flagged in memory as a shown object so as to prevent the object from being shown again. The system may memorize an object as a shown object if at least one guide unit of the object has been output, or memorize an object as a shown object if a specified guide unit having the highest priority has been output. Instead of objects, guide units per se may be flagged in memory as already-output guide units.

Next, an example of guidance processing will be explained briefly with reference to FIG. 5 which shows a vehicle travelling near the gate Kaminari-mon in Asakusa, Tokyo. The guide image and voice data for Kaminari-mon, which is currently the guide object, is 5 stored in the guide data storing means 3, as shown in the FIG. 5. The guide output means 6 extracts data for guide objects which satisfy the aforementioned guidance initiation condition from the guide data storing means 3 according to the vehicle current position, advancement direction and vehicle speed obtained from the current position detecting means 5. If "Kaminari-mon" is extracted as a guide object, the guide output means 6 reads the data for guide image and voice output of Kaminari-mon and converts the data to corresponding output signals. When the guide video signal is output, the switching means 7 switches the map picture display signal output from the map picture output means 4 to the guide video signal, causing the display output means 8 to output the guide image as shown in the FIG. 9 and the audio output means 9 to output the voice guidance "Asakusa makes you feel . . . ". When such guidance is terminated, the guide output means 6 flags "Kaminari-mon" in memory as an already shown object. Therefore, even if the vehicle again passes Kaminari-mon from a different direction, it is possible to prevent repeat output of that guide data.

Figure 5:
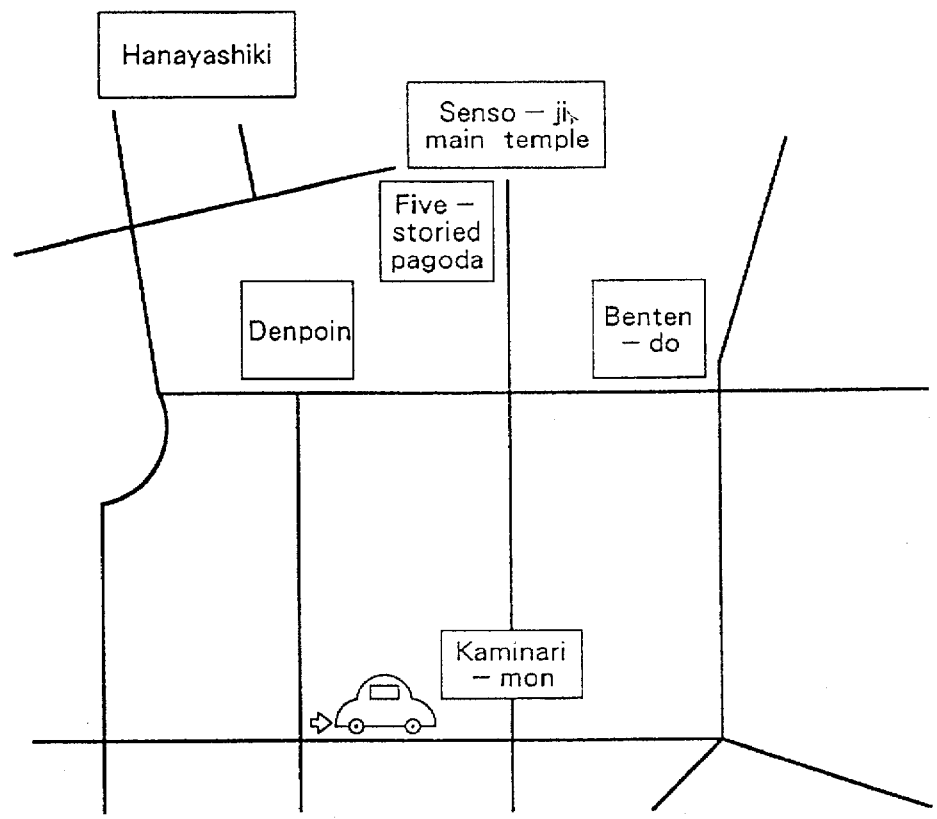
FIG. 5 is a diagram showing a variety of guide objects.
Figure 5:
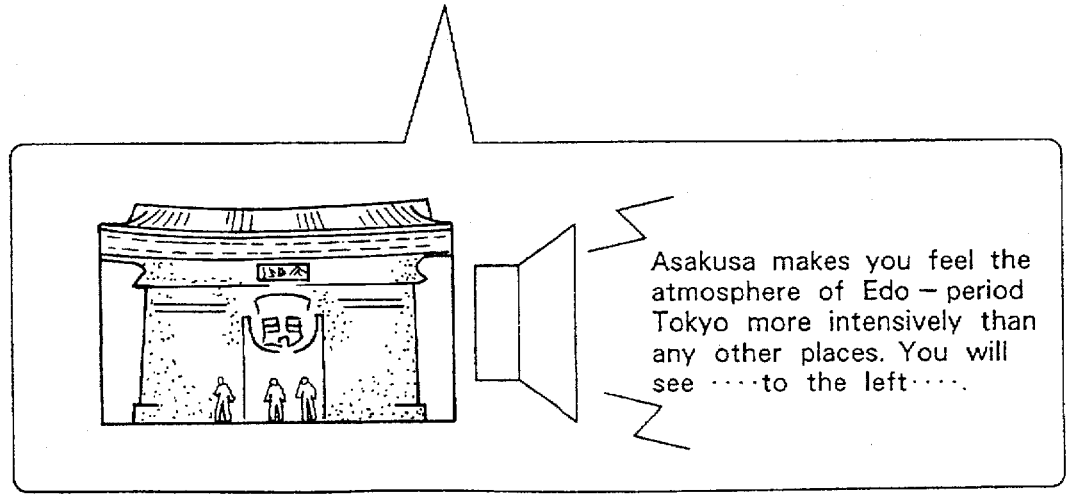

However, assuming that the guide system does nothing but search for guide objects on the basis of current position as in FIG. 5, if the vehicle passes straight from the left to the right, only image and voice guidance for Kaminari-mon are output. Other guide objects which are not seen from the road on which the vehicle travels, such as the main temple of Senso-ji, a five storied pagoda, Denpoin, Benten-do, Hanayashiki or the like, are not included in the guide information for Kaminari-mon. Then, if user wants guide information about prominent objects (having high priority) around the current position, operating the manual key of the control means 1 causes the guide data output means to extract guidance data for objects in the vicinity of the current position and output the requested guidance. In the case in which a plurality of guide objects are extracted, it is permissible to list the extracted objects and select desired objects from them for output, or to output guide objects nearest the current position in sequence or to first show one object near the current position and then show another object which is near the first shown object or to assign priority to the extracted objects and output the objects according to their order of priority. Although a guide sentence saying "You see . . . a on the right of road S" is output when an object located on a road is automatically extracted based on the current position, when data for objects which can not be seen directly from a road is extracted from memory by means of the manual key, guide sentences are divided to guide units and appropriately modified, e.g. "There is . . . away from the road to the right", "There is . . . to the right near here" or the like.

There may arise a situation in which the current position of the vehicle, location of a guide object or situation of the object are not known when object guidance is started. In such a case, if the map key of the control means 1 is operated, the switching means 7 switches the guide video signal output from the guide output means 6 to the map picture display signal output from the map picture output means 4, so that a map picture as shown in FIG. 5 is displayed. During this switching operation, corresponding voice guidance is output. In this manner, it is possible to switch to the map picture even after object guidance is started in order to obtain information about the location of the guide object and its surroundings.

An example of the guide output means will be described with reference to FIG. 6 which is a diagram showing an example of the construction of the guide output means in detail.

Figure 6:
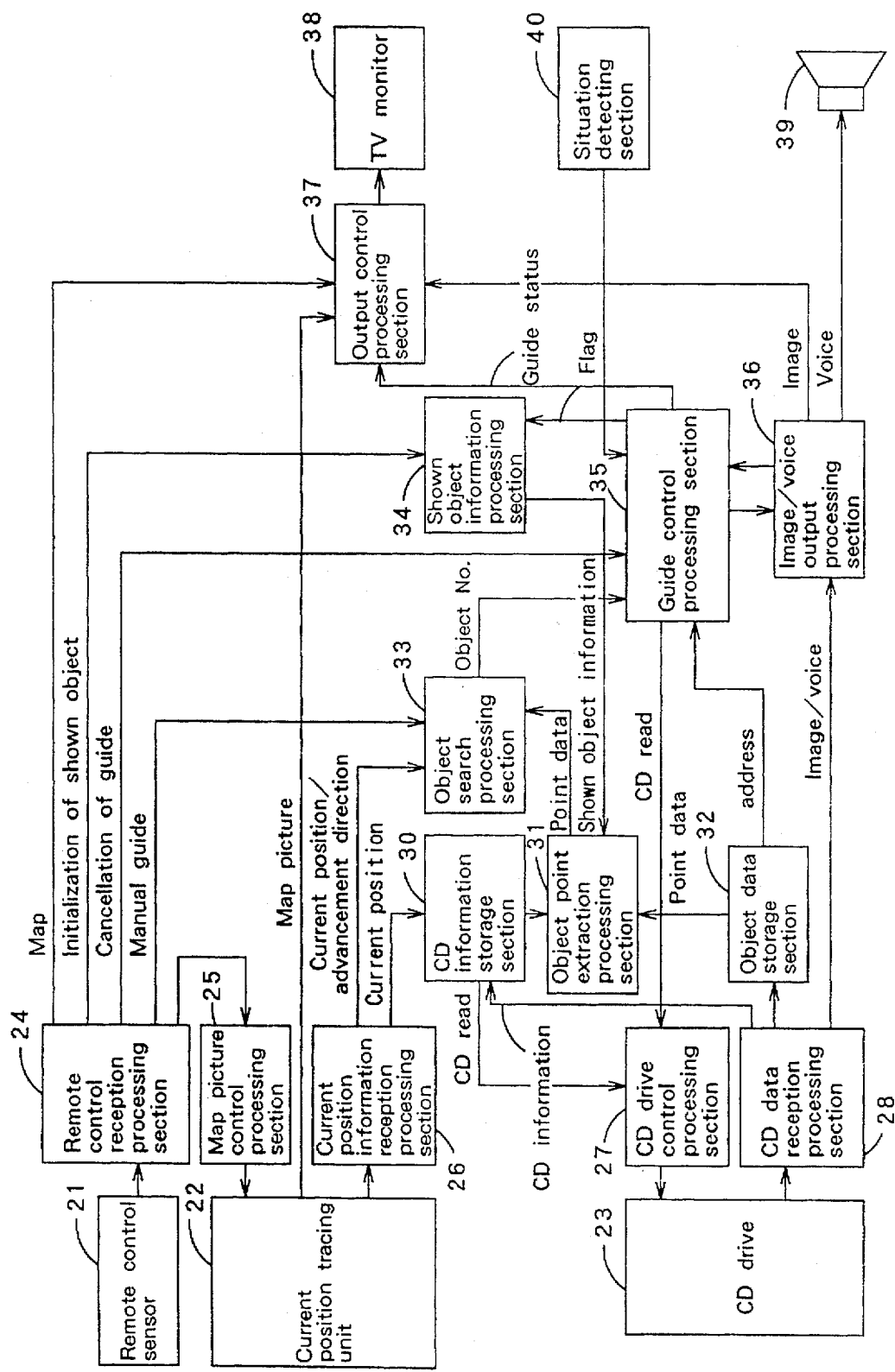
FIG. 6 is a block diagram of a system configuration showing the details of the guide output means.

Referring to FIG. 6, a remote control sensor 21 receives various control signals such as a start-up signal and a stop signal transmitted from a wireless remote controller, for example, as an optical signal which is converted into an electric signal. The control signals from the remote controller include an a shown object initialization command, a guide cancellation command, a manual guide command, a current position map picture control command and the like. A remote control reception processing section 24 converts signals received by the remote control sensor 21 into key codes by decoding and then, transmits the shown object initialization command to a guide information processing section 34, the guide cancellation command to a guide control processing section 35, the manual guide command to an object search processing section 33 and the current position map picture control command to a map picture control processing section 25. The map picture control processing section 25 converts a map picture control command which is received by the remote control sensor 21 and processed by the remote control reception processing section 24 according to a communication format and transmits the converted command to a current position tracing unit 22. The map picture control processing means 25 changes the scale of the map picture (reduction/expansion) and the direction of the map (north/south) displayed on a TV monitor 38, according to a map picture control command.

The current position tracing unit 22 detects and traces the current position of a vehicle. The current position tracing unit 22 has, for example, GPS, vehicle speed sensor, map data or the like to detect and trace a current position in terms of the longitude and latitude, the road on which the vehicle is traveling, traveling direction and vehicle speed to provide data for a map of a predetermined orientation and scale, with the current position substantially at the center. Thus, it is permissible to use a conventional navigation system as the current position tracing unit 22. A current position information reception processing section 26 extracts current position information received from the current position tracing unit 22, transmits current position and identification of the road travelled to a CD information storage section 30, and transmits the current position, advancement direction and traveling speed to an object search processing section 33.

The CD drive 23 reads a plurality of guide CDs storing guide information. The CD drive control processing section 27 processes control information for controlling reading of the guide CDs by the CD drive 23 according to CD/read commands from the CD information storage section 30 or from a guide control processing section 35, and gives instructions to the CD drive 23. A CD data reception processing section 28 receives CD data read out according to read control information, transmits CD information to the CD information storage section 30, transmits object data to an object data storage section 32, and transmits compressed guide image and voice data to an image/voice output processing section 36.

The CD information storage section 30 issues read commands to read CD information from each guide CD, stores CD information, such as the disk label of each guide CD, guide object file, guide point file or the like, issues a read command to read data for objects in the vicinity of a current position according to the stored CD information and the current position, and transmits the coordinate range for extracting point object data to an point object extraction processing section 31.

The object data storage section 32 stores the object data selected from the CD data processed by the CD data reception processing section 28, transmits the point object data to the point object extraction processing section 31 and transmits object address to the guide control processing section 35. The point object extraction processing section 31 masks already-output information or data of the point object stored in the object data storage section 32 and extracts data for a point object in the vicinity of the current position. An object search processing section 33 searches point object data for an object to be shown which is identified by number (object No.), according to the current position, advancement direction or manual guide command.

The guide control processing section 35 controls guidance according to a guide cancellation command from the remote control reception processing section 24, object No. from the object search processing section 33 and information about time, season, weather and the like from a situation detecting section 40. The guide control processing section 35 selects the object address of an object No. found by the object search processing section 33 from the object addresses stored in the object data storage section 32, and transmits a CD read command to the CD drive control processing section 27, transmits a guide command (guide start/cancellation) to an image/voice output processing section 36 and transmits a guide status command from the image/voice output processing section 36 to an output control processing section 37. Further, the guide control processing section 35 sets a shown object flag for a shown object in information processing section 34. The shown object information processing section 34 holds the shown object flag set by the guide control processing section 35 until it is initialized by a shown object initialization command from the remote control reception processing section 24, and transmits the shown object information to the point object extraction processing section 31.

The image/voice output processing section 36 decodes guide code data received through the CD data reception processing section 28. The image/voice output processing section 36 decodes the code data and transmits the respective decoded signals to the output control processing section 37 for the TV monitor 38 and to the speaker 39. The output control processing section 37 for the TV monitor 38 switches from a map picture sent from the current position tracing unit 22 to a guide image sent from the image/voice output processing section 36 according to a guide status signal input from the guide control processing section 35 and a map switching signal from the remote control reception processing section 24.

In FIG. 6, the remote control sensor 21, the remote control reception processing section 24 and the map picture control processing section 25 constitute the control means 1 as shown in FIG. 1. The current position tracing unit 22 comprises the map picture data storing means 2, the current position detecting means 5 and the map picture output means 4 as shown in FIG. 1. The CD drive 23, the output control processing section 37, the TV monitor 38 and the speaker 39 correspond to the guide data storing means 3, the switching means 7, the display output means 8 and the audio output means 9, respectively. The situation detecting section 40 corresponds to the situation detecting means 11-1, 11-2, ... and the other processing sections (26–36) constitute the guide output means 6.

Operation of the overall system will now be described. First, when the system is started, the CD information storage section 30 issues a read command to read CD information from respective guide CDs and stores the read information so as to be ready for the start of guidance. The CD information storage section 30, when receiving current position information from the current position tracing unit 22, issues a command for reading object data contained in a specified area including the current position by referring to the CD information and stores the read object data in the object data storage section 32. The point object extraction processing section 31 extracts point object data, excluding shown object information, from the point object data stored in the object data storage section 32. The object search processing section 33 searches the point object data extracted by the point object extraction processing section 31 for the number of an object to be shown, according to the current position and advancement direction.

The guide control processing section 35 issues a read command to the CD drive control processing section 27 by referring to the address of the object data stored in the object data storage section 32, according to the object No. and a detection signal from the situation detecting section 40. The situation detecting section 40 comprises a calendar, a clock, a thermo-hygrometer, a rainfall sensor, a traffic congestion receiver or the like. In this embodiment, the situation detecting section 40 determines a situation by considering signals from all these detectors. More specifically, the situation detecting section 40 comprises a matrix corresponding to ON/OFF detection signals and determines a situation according to this matrix. Optionally, the situation detecting section 40 may transmit plural signals, each individually corresponding to the output signal of one sensor, without such synthetic judgement. The situation detecting section 40 issues a read command for selecting a guide sentence corresponding to the content of such a detection signal. Data for image (compressed) and voice (compressed) guidance is input to the image/voice output processing section 36 from a guide CD by this read command. The image/voice output processing section 36, on receiving a guide command from the guide control processing section 35, decodes data for image (compressed) and voice (compressed) guidance to generate a video guidance signal for the TV monitor 38 and a guide voice guidance signal for the speaker 39, and transmits these signals. At the same time, the image/voice output processing section 36 transmits a guide status signal to the guide control processing section 35. When this guide status signal is transmitted to the output control processing section 37, through the guide control processing section 35, the output control processing section 37, changes video signal for the TV monitor from a map picture output (from the current position tracing unit 22) to a guide image (from the image/voice output processing section 36). When each guide unit is completed, the image/voice output processing section 36 notifies the guide control processing section 35 of the event. The guide control processing section 35 sets a flag indicating shown object information in the shown object information processing section 34.

The wireless remote controller has keys as shown in FIG. 7. In FIG. 7, a START/STOP key is used for starting a program stored in a CD-ROM, starting with display of a title picture and stopping with display of a map picture. A NORTH/SOUTH key is used for inverting the north/south direction of a map when a map picture is displayed. When a vehicle is advancing toward the North from an East-West location, a map picture in which North is up is displayed. This north/south key is used to switch the display screen to a map picture in which the south is at the top or change the screen inversely. A manual key is used for starting guidance for a guide object manually selected from a displayed map picture or a guide image or for starting guidance for a candidate guide object which appears in the course of the manually selected guidance. A detail key and a wide-area key are used for changing the scale of the map picture and displaying the scale. A set key is used for initialization and correction of the current position in a map picture. A STOP key is used for canceling an operation, such as canceling of a guidance on automatic guide screen or manual guide screen to return to a map picture, cancellation of initialization, cancellation of correction of the current position or the like. Arrow keys are used for moving the current position cursor in order to correct the current position on a map picture. A map key is used for changing a displayed guide image to a map picture.

Figure 8:
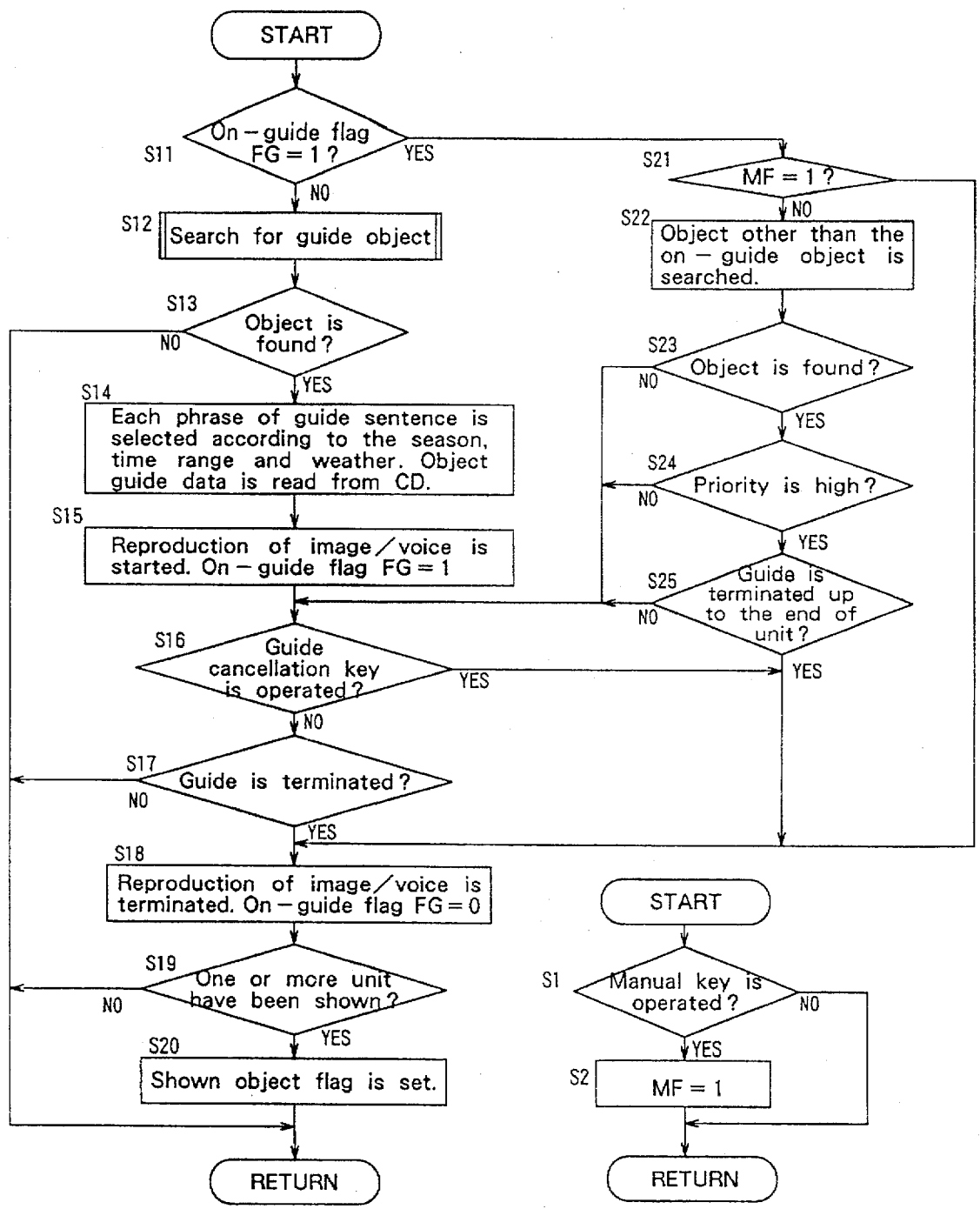
FIG. 8 is a flowchart of guide object searching and guidance processing.

The operation of the manual key is always monitored as shown in FIG. 8 (step S1). When the manual key is operated, the manual mode flag MF is set to "1" (step 2). In object search/guidance processing, whether the on-guide flag FG is "1" (step S11) is checked. The on-going flag FG is set to "1" while guidance is being performed. Unless this on-guide flag FG is "1", a guide object is searched for (step S12). If a guide object is found, the guide data for that object is read from the CD and then synthesis of image and voice is started, so that the on-guide flag FG is set to "1" (steps S13–S15). After this, operation of the guide stop key is checked, and unless that key is operated, a check is made to see whether the guidance has been finished (steps S16, S17).

If the on-guide flag FG is "1", whether the manual mode flag MF is "1" is checked (step S21). If the manual mode flag MF is 35 set to "1", synthesis of image and voice is canceled and then the on-guidance flag FG is reset to "0" (step S18). However, if the manual mode flag MF is "0", an object other than the on-guidance object is searched for (step S22). If such an object is found, the priority of next located object is checked relative to that of the on-guidance object (step S23, S24). If the priority of the on-coming object is higher, guidance is performed up to the end of the current guide unit of the on-guidance object (step S25) and then step S18 and the following steps are executed.

If it is determined that the guidance cancellation key is operated in step S16, or if the guidance is finished in step S17, or if the manual mode flag MF is set to "1" in step S21, or if it is determined that the on-guide object is finished up to the end of the guidance unit in step S25, image and voice guidance is terminated and the on-guide flag FG is reset to "0" (step S18). At this time, if one or more guidance units have been shown, a shown object flag is set for each of the shown objects (steps S19, S20)

Figure 9:
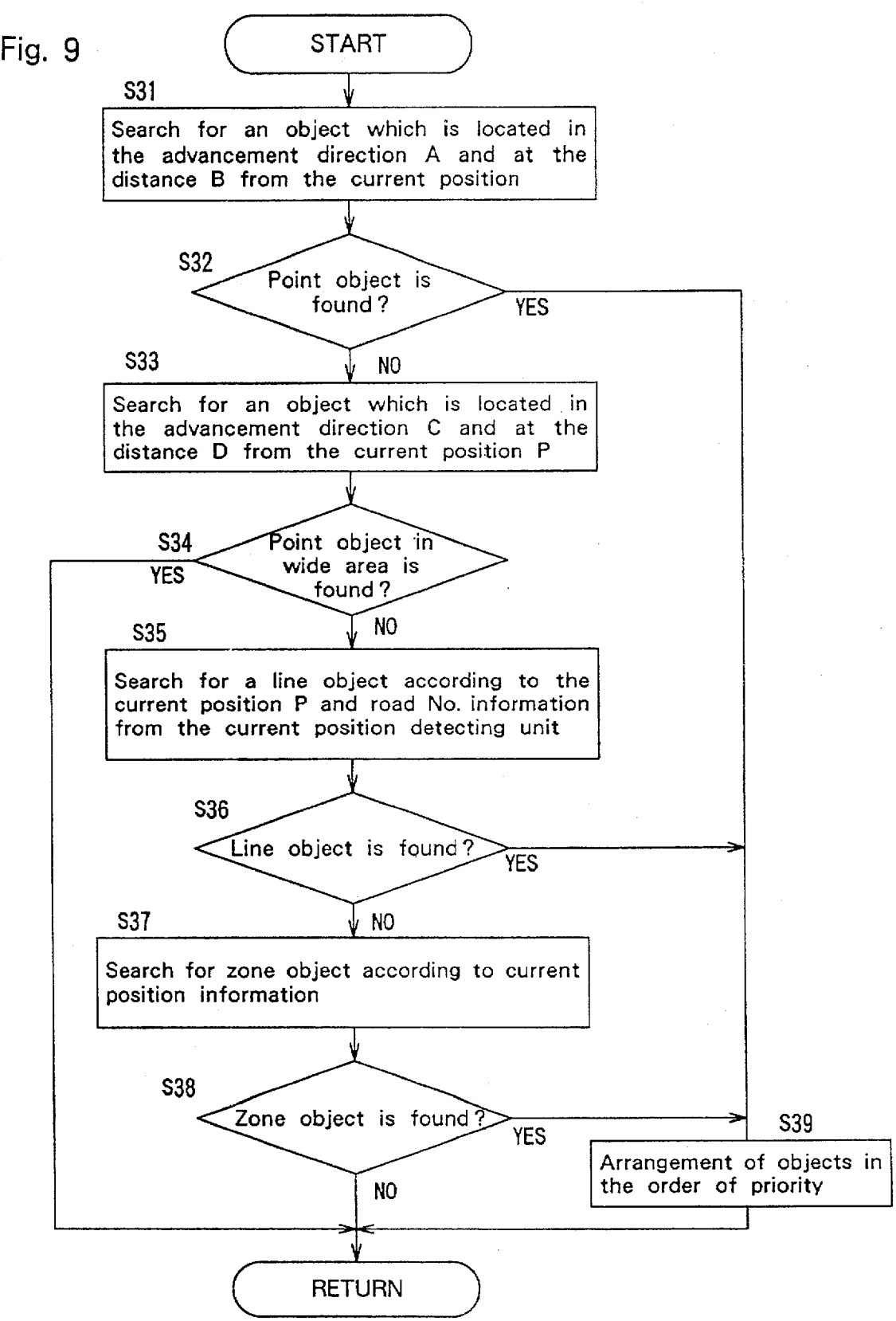
FIG. 9 is a flowchart for searching for a guide object responsive to manual input of a request.

In the search of step S12, a point object is searched for as shown in FIG. 9 (step S31). If no point object is found (step S32), a search is performed to find a point object within a wider area, that is, within the advancement direction C° from the current position and within the distance of D m from the current position (C°>A°, D>B) (step S33). It is determined whether any point object exists within that wider area (step S34). If a point object is found in with the wider area, the program returns. The reason for this procedure is that the point object will soon be found in the normal area as the vehicle travels. However, if there is no point object found in the wider area, it means that no guidance output for a point object will be provided for a while. Thus, a line object is searched for according to road No. information specified from, for example, the current position P (step S35). If there is no line object (step S36), a zone object is searched for according to current position information (step S37). If any zone objects are extracted, they are arranged according to their priorities (step S39). Then, the processing continues from step S13 on, as illustrated in FIG. 8.

Figure 10:
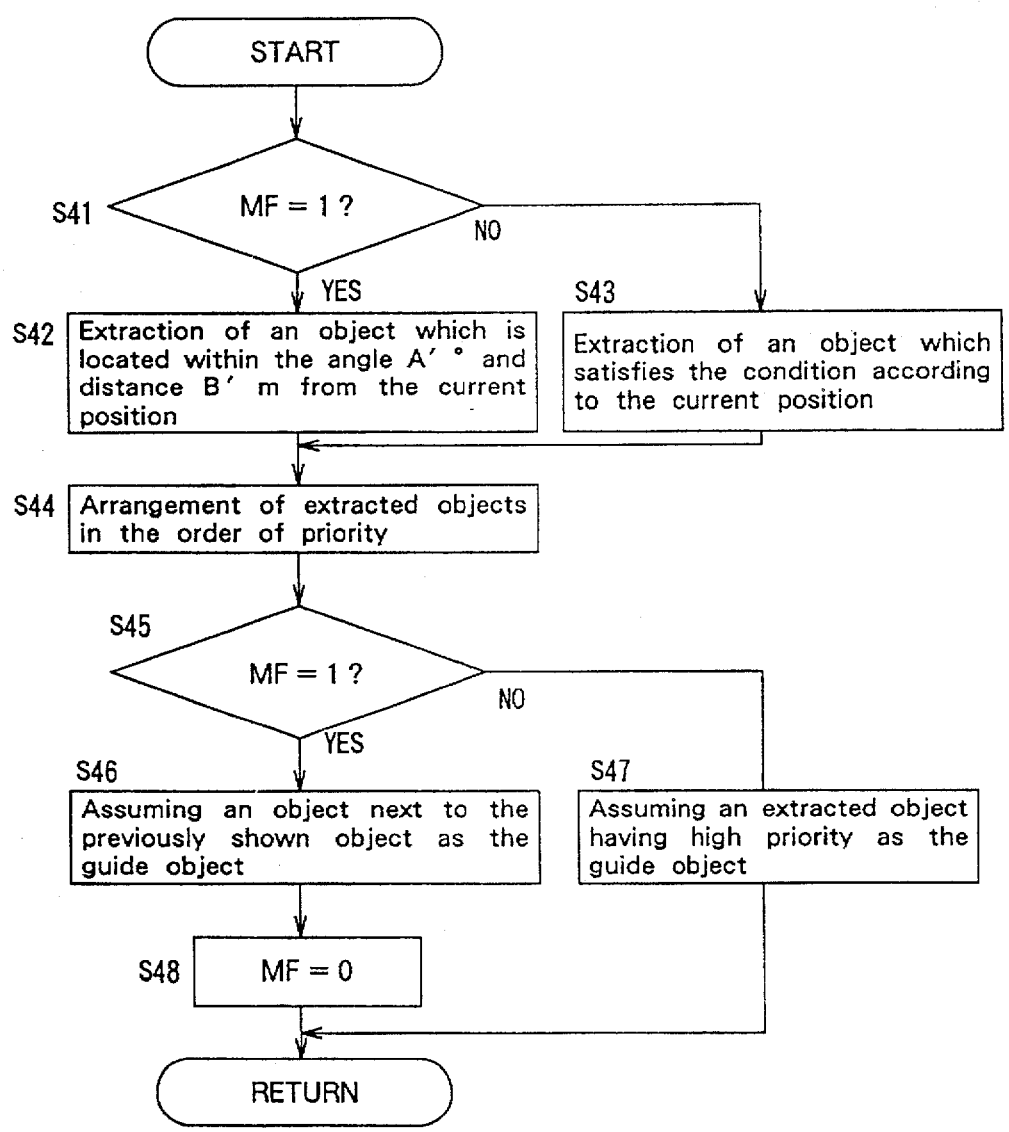
FIG. 10 is a flowchart for guide object searching.

In point object search processing in the step S31, whether or not the manual mode flag MF is "1" is checked for, as shown in FIG. 10 (step S41). If the manual mode flag MF is "0", objects which satisfy that condition are extracted for the current position (step S43). If the manual mode flag MF is "1", objects which satisfy the condition where objects are within a wider area, that is, within the advancement direction A'° from the current position and within the distance of B' m from the current position are extracted (step S42). Then the extracted objects are arranged according to their priorities (step S44). If the manual mode flag MF is "1", an object having priority next to the priority of a previously shown object is used as a guide object and then the manual mode flag MF is reset to "0". If the manual mode flag MF is "0", the object having the highest priority is used as a guide object. The processing then continues from step S32 in FIG. 9.

In the aforementioned processing for extraction of a guide object and output of the guide object in order of priority, it is permissible to provide sets of object data stored in order of priority in the guide CD and to extract an object No. from point data found by the object search processing section 33 and to output the guide object according to its priority. Further, it is permissible to obtain the distance between the current position and an object found according to the current position and then output guide objects sequentially according to distance, that is, starting with the guide object which is nearest to the current position. More specifically, if a plurality of guide objects 1, 2, 3, 4 are found and extracted with reference to the current position of a vehicle, the distances to the respective guide objects d1, d2, d3, d4 are obtained. If the relation of d4<d1<d3<d2 is obtained as a result of comparing these distances, first data for the guide object 4 is output, followed by the output for the guide objects 1, 3, and 2. The distance from the current position to an object can be calculated on the basis of the current position and the coordinates of the guide object, for example, the coordinates of longitude, latitude or the like. Further, it is permissible to select and output data for that guide object which is closest to the current position from among those guide objects found with reference to the current position. In other words, the distances from the current position to the currently output guide object and to the other guide objects are obtained, then guidance is output for the guide object nearest to the currently output guide object. This procedure is repeated. More specifically, if the guide objects 1, 2, 3, 4 are found with reference to the current position as in the aforementioned example, the distances d1, d2, d3, d4 from the current position to the respective objects are obtained. Then, if the relationship d4>d1>d3>d2 is obtained as a result of comparing these distances, the guide object 4 is first output. Then, the distances d41, d42, d43 from the guide object 4 to the respective objects 1, 2, 3 are obtained. Here, if the relationship d41<d43<d42 is obtained as a result of comparing these distances, the guide object 1 is output. In the same manner, the distances d12, d13 from the guide object 1 to the respective objects 2, 3 are obtained. If the relationship d12<d13 is obtained as a result, the guide object 2 is output and finally the guide object 3 is output.

Figure 11:
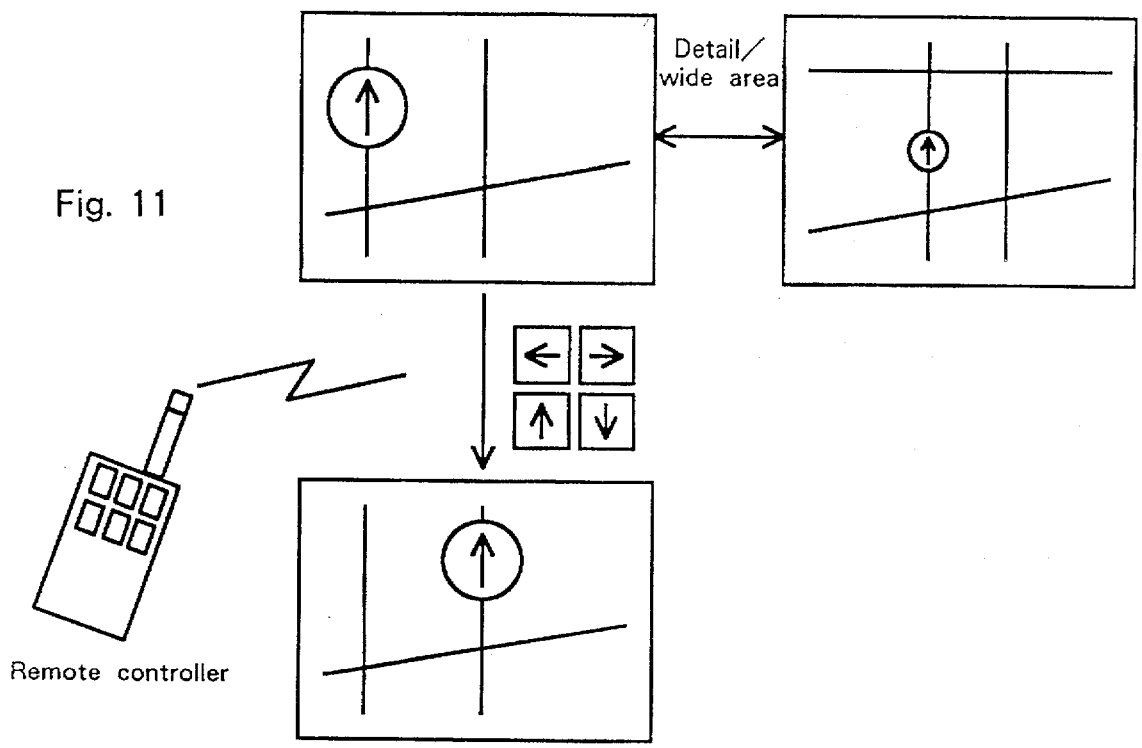
FIG. 11 illustrates the showing of a current position.

If the current position is not stored because of initialization condition or because the memory is erased due to the removing of a battery or because of any other reason, it is necessary to set a current position. The current position is set by moving the current position on a map picture by means of the arrow keys, the detail key or the wide area key, as shown in FIG. 11.

Figure 12:
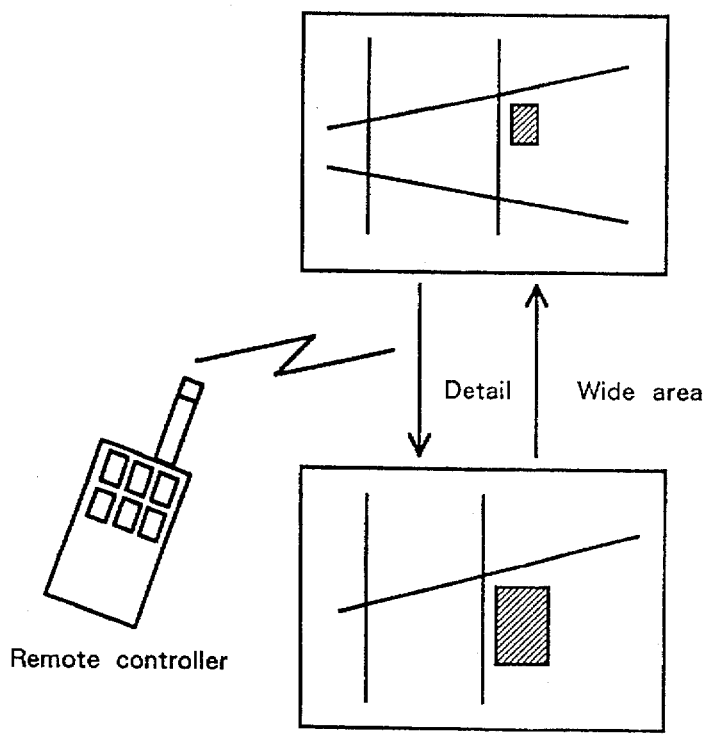
FIG. 12 illustrates the operation of changing the scale of a map picture.
Figure 13:
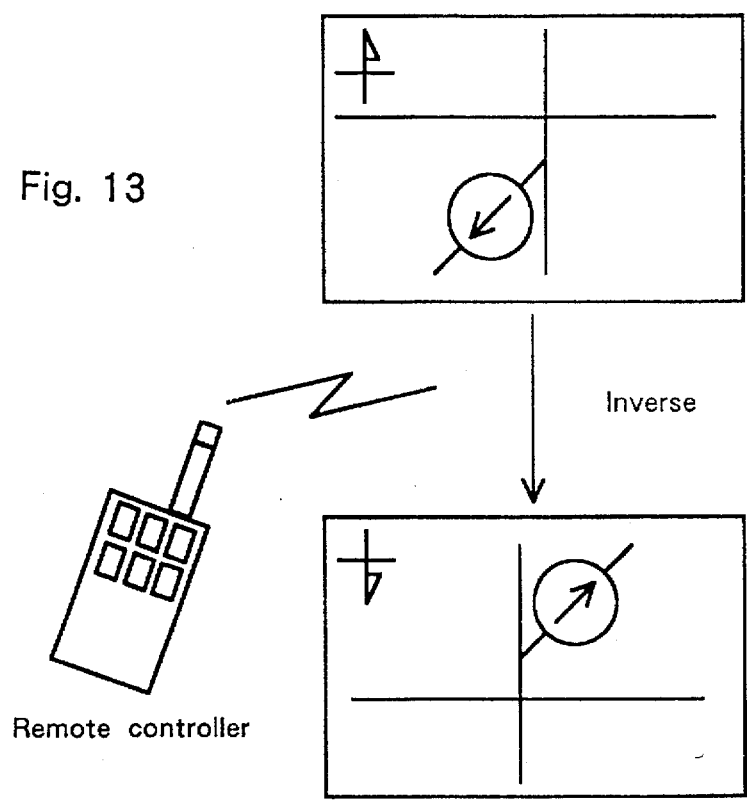
FIG. 13 illustrates determination of north and south on a map picture.
Figure 14:
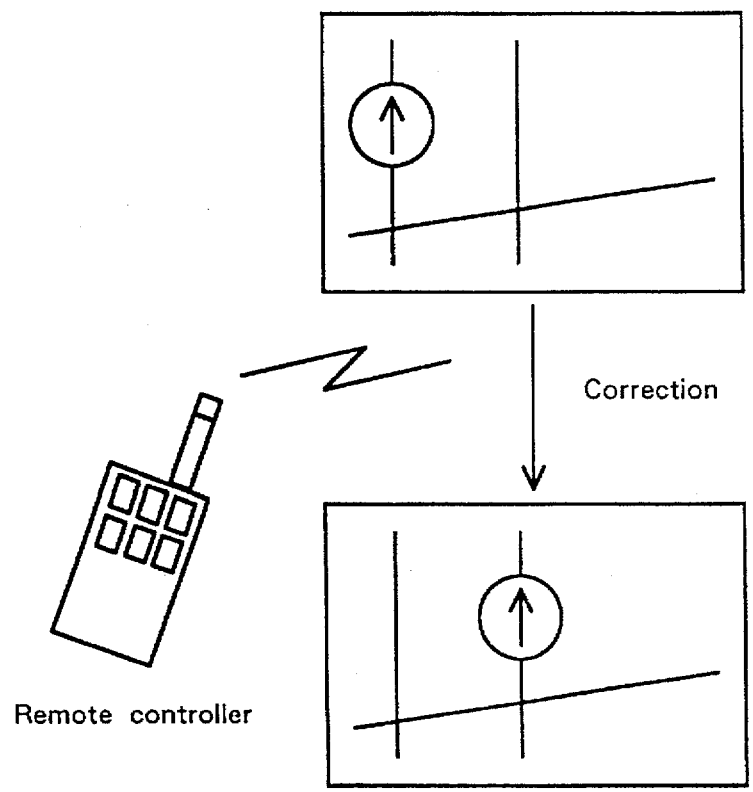
FIG. 14 illustrates correction of the current position.

In the automatic guidance mode, if there is no guide object in the vicinity of the current position and guidance is not being performed, a map picture is displayed. Although objects are being searched for in this case also, it is possible to change the scale of a map by operating the detail key or the wide area key as shown in FIG. 12. Further, it is possible to invert the north/south direction of the map by operating the north/south key as shown in FIG. 13. Still further, it is possible to correct the current position of a vehicle by operating the set key, the correction key and the arrow key as shown in FIG. 14.

FIG. 15 is a diagram showing an example of the file configuration of a guide CD. The file configuration of the guide CD, for example as shown in FIG. 15, comprises disk label header DLABEL, guide object file GLIST, guide point file PLIST, guide data DATA and direction data HOKO. A plurality of CDs make up the complete file configuration.

The disk label header DLABEL comprises disk label attribute data and applicable area table (longitude, latitude) stored in the disk and enables a determination if the current position is within the area of a disk. The guide object file GLIST contains a table of guide object data including guide object No., object attribute (point object, line object, zone object, and information on width of objects), number of guidance start points, guide unit attribute (voice/image, voice only, information on the length of a unit), object names, object position secondary grid No. and object position (longitude, latitude). The guidance point file PLIST has a table of guide points including point attribute, point position (longitude, latitude), advancement direction and direction voice No.

FIG. 16 illustrates a vehicle incorporating the guidance system of the present invention. Reference numeral 41 denotes a guidance output apparatus, numeral 42 denotes a vehicle speed sensor, numeral 43 denotes a remote control sensor, numeral 44 denotes a monitor TV, numeral 45 denotes a current position tracing unit, numeral 46 denotes a remote controller, and numeral 47 denotes a GPS antenna. In this example, the system of the present invention is applied to a sight-seeing bus, the bus being equipped with remote controller 46 and guide output apparatus 41. The TV monitor 44 and the remote control sensor 43 are mounted behind the driver's seat so that passengers can operate this remote controller 46 to switch between a sight-seeing display and a map picture display.

According to the above-described embodiment of the present invention, the guide objects are classified as point objects, line objects and zone objects, which are assigned in order of priority, and search and extraction of sight-seeing objects is with reference to the current position or the like, and guidance for the extracted objects is given in a specified order by means of voice and images. Thus, the system of the present invention outputs information about famous streets and the local area during any interval of time in which no information regarding a point object, e.g. sight-seeing attraction, is output. Thus, the interval of the time in which no guidance is performed is reduced so as to provide passengers with tourist information without boring them. Further, the system of the present invention enables a wider search for guide objects, e.g. sight-seeing attractions, by changing the search range to an area defined by a predetermined angle and distance, responsive to operation of a manual key, if no guide object is found as a result of searching of a more limited, specified range, automatically as the vehicle travels. Thus, it is possible to extract an object which could not be found in the initial search range by changing the search range. For example, if a vehicle goes and returns by the same route and the search range with respect to the current position is the same for the outbound and inbound trips, the same guide objects will be covered by the same explanation on both trips. However, if the user wants to receive, on the return trip, information about objects different from the objects covered on the outbound trip, it is possible to search for objects different from those covered on the outbound trip by changing the search range by operation of the manual key, so that passengers can receive information on the return trip different from that received on the outbound trip, thus providing satisfactory sight-seeing service. Further, when in the ordinary (automatic) guidance mode, if no object has been found for a long time or if a passenger requests information on a specific object, it is possible to search for a guide object in a search range varied by means of the manual key, so that sight-seeing objects can be identified and information on same can be output.

The present invention is not restricted to the aforementioned embodiment and can be modified in various manners. For example, although, according to the aforementioned embodiment, point objects, line objects and zone objects are classified and assigned in an order of priority so as to be searched according to that order of priority, it is permissible to configure the system to search for point objects over a wider area if no point object is found which satisfies current search parameters. Further, although guide objects are classified as either point objects, linear objects or zone objects, in terms of the attribute thereof, the present invention is not restricted to this classification; rather, it is permissible to classify buildings as point and linear objects and to classify features of the natural environment, such as mountains, rivers and the like, as zone objects. It is also possible to classify guide objects by degree of notability, as an attribute thereof. Still further, in manual mode, it is possible to widen the search area, widen the search area in the direction of advancement of the vehicle and to select the search range freely. Additionally, it is permissible to change the search conditions so that the type of guide object is specified. That is, it is possible to set a condition that buildings such as temples or the like are searched first of all and in which sight-seeing sites other than buildings are searched only when the manual key is pressed. It is also permissible to add a condition whereby only objects that are located in front of the vehicle, along the direction of advance, are searched with respect to the current position, while objects located behind the vehicle, as defined by the direction of advance of the vehicle are excluded from the search. Still further, it is possible to configure the system with the objects further classified in more detail or wherein the order of priority can be changed.

In the guide data storage means 3 of the present invention, each guide unit for each guide object comprises a plurality of phrases forming guide sentences, and a plurality of guide sentences related to the season, time range, weather and the like are prepared. A guide sentence is formed, for example, with each phrase selected according to the season, the time range, the weather and the like detected by the situation detecting means 11-1, 11-2, . . . . For example, season-related guidance might include phrases such as "Many people gather to see cherry blossom at this time of year, . . . ", "A number of people camp or barbecue around a park called . . . ", "Every year, 200,000 people see a festival called . . . for four days from . . . to . . . ", "The shrine . . . where many people come on the 1st day of January was built about 560 years ago . . . ". It is possible to select a guide sentence appropriate for the season according to a calendar. Representative sentences related to the time of day might include a "Business area extends from the opposite side of this street, and is filled with commuters, presenting an active atmosphere different from the night scene," "in daytime, this area is filled with business people and foreign tourists while, at night, this area operates entirely as an amusement site, in the forefront of Tokyo night life", "Even after midnight, this area is active, with the appearance of a trendy town, always crowded." Thus, it is possible to select a guide sentence appropriate to commuter time, daytime, night or midnight. With regard to the weather also, if phrases such "Hot and stuffy", "Scorching hot", "Hot", "Warm", "Mild", "Chilly", "Cold", "Frosty" are prepared, it is possible to select a sentence appropriate for the detected temperature and humidity. Phrases such as "The weather is fine . . . ", "When it rains, . . . ", "It is beginning to rain, . . . ", "It rains heavily, . . . ", "It has stopped raining, . . . " make it possible to form sentences appropriate for the weather, in accordance with the detection signal presented by the weather sensor, an illuminometer or the like.

As described above, a plurality of guide sentences regarding the season, time of day, the weather and the like are stored in the guide data storage means 3 and the current situation for a vehicle is detected by means of the situation detecting means. Then, appropriate guide data is extracted by the search means of the guide output means 6 from the guide data storage means 3 and selected and output according to the situation detected by the situation detecting means 11-1, 11-2, . . . . Thus, it is possible to select guide sentences appropriate to the situation when the guidance is output and edit them so that the presented guidance fits to and is natural for the environment of the current position of the vehicle. The guide sentences for guide objects stored in the guide data storage means 3 are divided into a plurality of phrases, thus making it is possible to select phrases according to the situation of the current position and, further, to combine the phrases freely.

Although, in the described embodiment, appropriate phrases of the guide sentence are selected in view of the season, time of day, the weather and the like, it is permissible to add guide units for traffic congestion information which are output according to the degree of traffic congestion. Although, in the described embodiment, guide sentences are divided into a plurality of guide units and stored, and an appropriate guide sentence is composed by combining them according to the situation, it is permissible to store a plurality of guide sentences correlated with different situations and to select an appropriate guide sentence according to the detected situation. However, if the guide sentences are divided to a plurality of guide units and stored, with appropriate guide sentences created by combining guide units according to the situation, the amount of stored data may be reduced as compared to storage of complete sentences. Further, it is permissible to use typical sentences common to all situations and to simply change a phrase corresponding to the change of situation.

Figure 17:
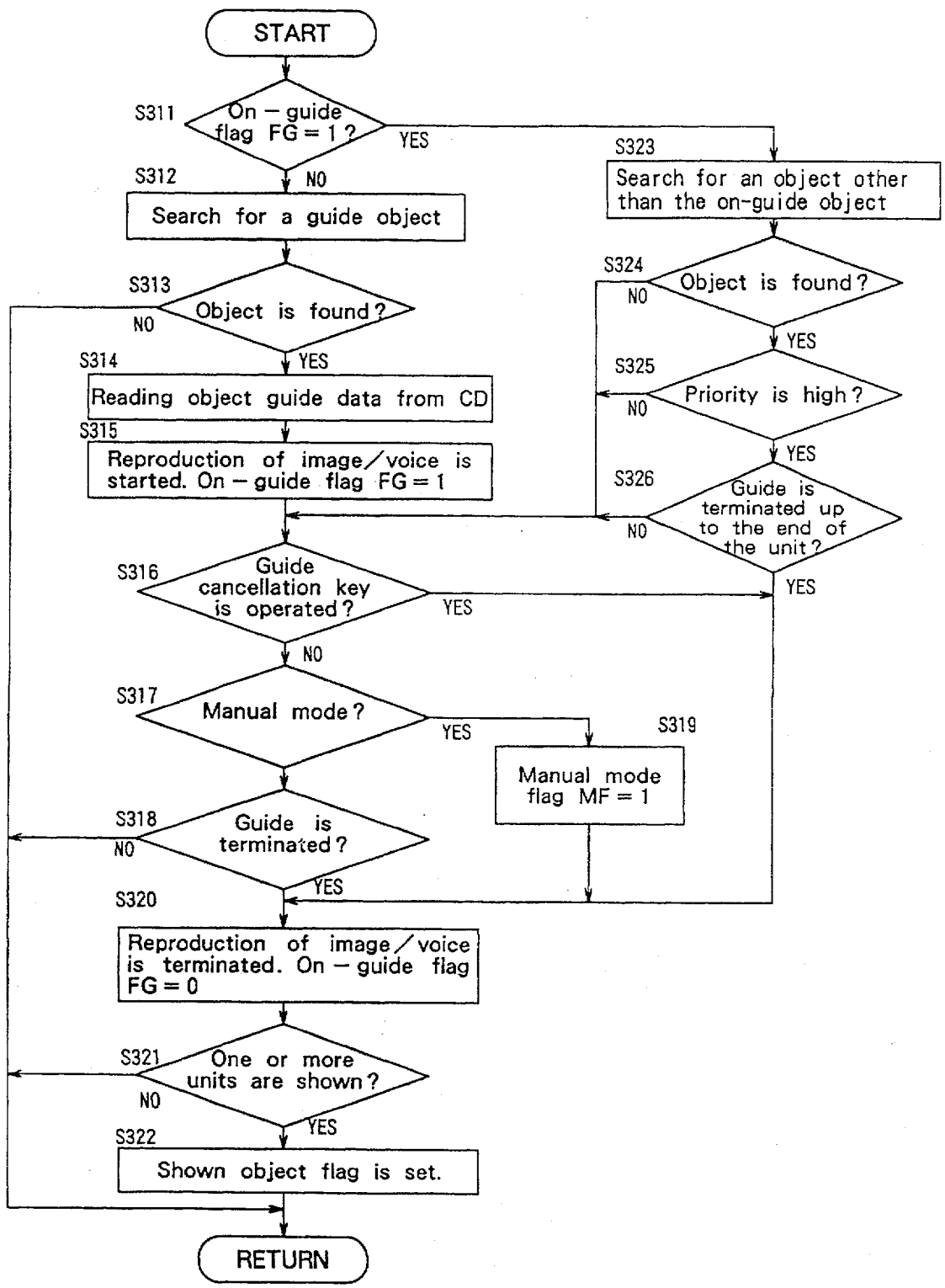
FIG. 17 is a flowchart for the setting of a guidance flag.

The guide output means 6 of the present embodiment may be as shown in FIG. 17. First, whether the on-guide flag FG is "1" is checked (step S311). If the on-guide flag FG is not "1", guide objects are searched (step S312). If a guide object is found, the guide data for the object is read from the CD and then output of image and voice is started, so that the on-guide flag FG is set to "1" (steps S313–S315). After this, the guide cancellation key and the manual key are checked for operation and, if they are not operated, a determination is made as to whether guidance has been finished (steps S316–S318).

If the on-guide flag FG is "1", an object other than the on-guide object is searched (step S323). If an object is found, its priority is checked against that of the on-guide object (steps S324, S325). If the priority thereof is higher than that of the on-guide object, when the guidance for the on-guide object is output to the end of a guide unit (steps S326),the next step S320 and subsequent steps are executed.

If it is determined that the guide cancellation key has been operated in the aforementioned step S316 or if the manual key has been operated and it is determined that the manual mode is ON in step S317, so that the manual mode flag MF is set to "1" (step S319) or if the guide has been completed in step S318 or if it is determined that the guidance for the on-guide object has been output to the end of the guide unit, output of image and voice guidance is immediately terminated and the on-guide flag FG is reset to "0" (step S320). At this time, if one or more guide units for the on-guide object have been output, the shown object flag is set for that object (steps S321, S322).

Figure 2:
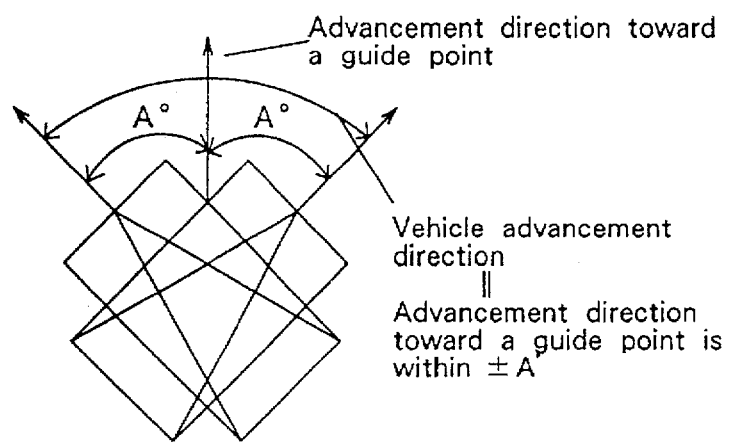
FIGS. 2a, 2b and 2c illustrate the conditions for starting guidance for a given guide object.
Figure 2:
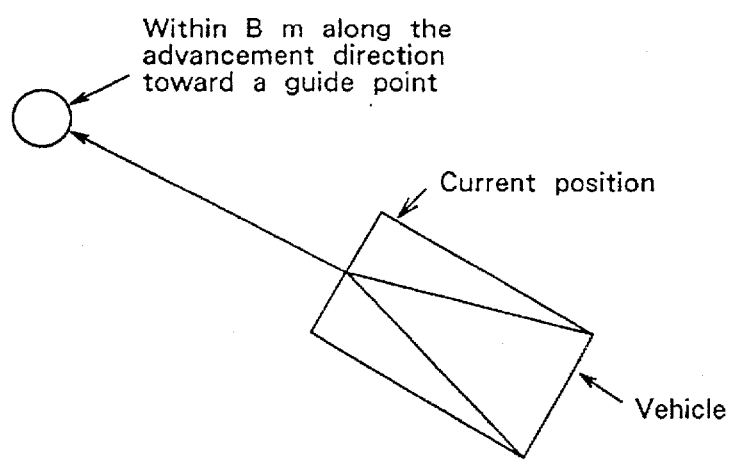
Figure 2:
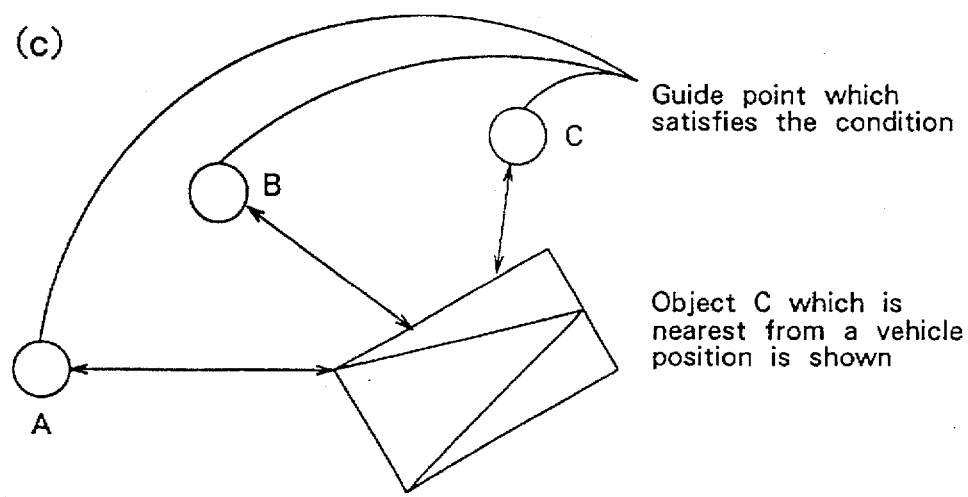
Figure 18:
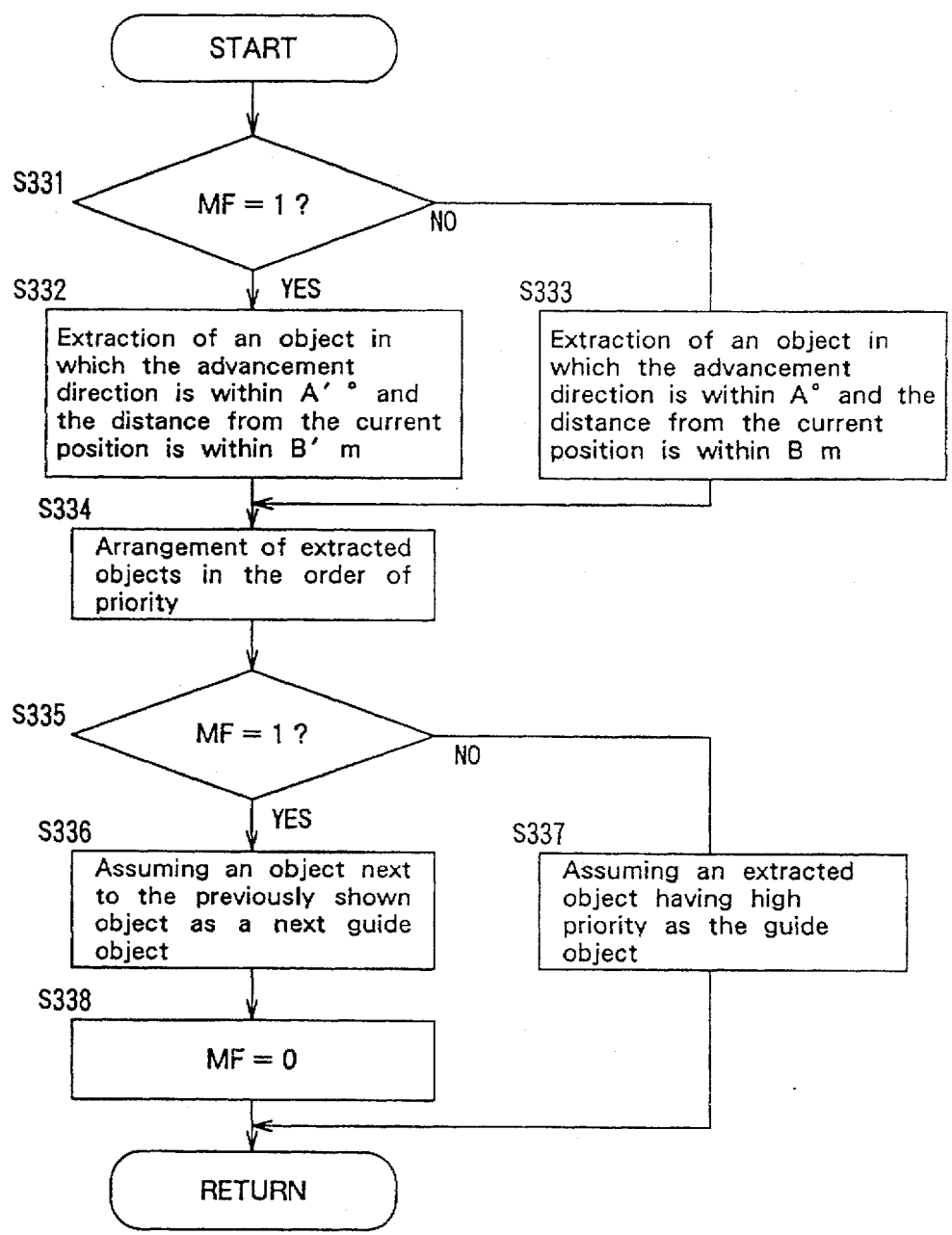
FIG. 18 is a flowchart for searching for a guide object.

In the search processing of a guide object in step S312 in FIG. 17, a determination is made if the manual mode flag MF is "1" as shown in FIG. 18 (step S331). If the manual mode flag MF is "0", objects which satisfy the condition where the advancement angle is within A° and the distance from the current position is within B m, as explained in connection with FIG. 2, are extracted according to the current position, direction and speed of the vehicle (step S333). If the manual mode flag MF is "1", objects which satisfy the condition where the advancement angle is within A'°, which is wider than A°, and the distance from the current position is within B'm, which is longer than B m, are extracted (step S332) and the objects which satisfy such conditions are arranged in order of priority (step S334). If the manual mode flag MF is "1", an object next to the previously shown object is chosen as a guide object and then the manual mode flag MF is reset to "0". If the manual mode flag MF is "0", the object having the highest priority is chosen as a guide object.

As described above, if the next guide object is extracted during guidance for an on-guide object, the guide output means 6 of the aforementioned embodiment cancels the guidance for the on-guide object when the current guide unit is finished, and then guidance for (display and commentary on) the next guide object is started. Thus, even if a plurality of guide objects are identified at the same time, it is possible to switch the guidance at the end of every guide unit. Thus, the guidance output of the present invention enables guidance for respective objects without inconvenience.

Because priority is set for the guide data, the guide output means compares the priority of an on-guide object with that for the next guide object, when the next guide object is extracted during current guidance (for the on-guide object), further guidance is provided for that object having higher priority. Thus, guidance for important objects can be provided in detail thereby achieving well-balanced guidance without an omission. Because guide data is stored in the form of a plurality of guide units and the respective guide units are assigned priority, the guide output means compares guide data in terms of the priority of each guide unit, and extracts that guide data having the higher priority. Thus, by setting priority for each guide unit, it becomes possible to provide important information for guide objects without omission, thereby reducing the number of the objects which are not covered by guidance.

Further, because already output guide data is flagged as "shown", even if the vehicle returns by the same road, it is possible to omit the previously "shown" guide data upon the return trip from the destination. Moreover, by assigning a relative priority to each guide unit, it becomes possible to output those guide units which have not been previously output ("shown"), according to the assigned priority.

The present invention is not restricted to the aforementioned embodiments but can be modified in various manners. For example, although in the aforementioned embodiments already shown objects will not be shown again, it is permissible to assign the shown objects low priority in order to again show the already shown objects when there is no guide object in the vicinity of the current position of the vehicle.

What is claimed is:

1. A guide system for a vehicle comprising:
   guide data storing means for storing guide information on roads, information on objects located along roads and objects in the local area of roads, in the form of guidance data, said guidance data being classified in storage into plural different classifications;

current position detecting means for detecting and tracing the current position of the vehicle;

guidance selection means including a plurality of guide search means for searching said stored guide information to identify a guide object in the vicinity of the detected current position, said plural guide search means each being dedicated to one of the different classifications, each of said guide search means searching exclusively within the classification to which each guide search means is dedicated wherein said guidance selecting means automatically selects said plurality of guide search means in a predetermined sequence; and guide information output means for outputting the guide information for the identified guide object.

2. A guide system according to claim 1 wherein said guidance selection means assigns a ranking in an order of priority to each of said plurality of search means, and wherein said plurality of search means search sequentially according to their rankings in said order of priority until a guide object is identified.

3. A guide system according to claim 1 wherein said classifications comprise a classification for point objects, a classification for linear objects and a classification for zone objects and wherein said guidance selection means ranks said classifications in an order of priority.

4. A guide system according to claim 1 wherein, if a plurality of objects are identified by the searching, said guidance selection means assigns a priority value to each of the plural identified objects and outputs guidance information starting with guidance information for the identified object having assigned to it the highest priority value.

5. A guide system according to claim 1 wherein each of said guide search means automatically searches data covering an area within an angle A° relative to the direction of advance of the vehicle and extending from the guidance start point as the apex of the angle, said first area being further defined by a distance B from the detected current position, said guide system further comprising:

search area input means for manually inputting a signal to said guidance selection means whereby each of said guide search means searches an area within an angle of A'° relative to the direction of advance of the vehicle, with the guidance start point as the apex of the angle, and further defined as extending a distance B'm from the detected current position.

6. A guide system according to claim 5 wherein said angle A'° is greater than said angle A° and wherein said distance B' is greater than said distance B.

7. A guide system for a vehicle comprising:

guide data storing means for storing guide information on roads, information on objects located along roads and objects in the local area of roads, in the form of guidance data, said guidance data being classified in storage into plural different classifications based upon duration of guide information suitability for which guidance can start during vehicle movement;

current position detecting means for detecting and tracing the current position of the vehicle;

guidance selection means including a plurality of guide search means for searching said stored guide information to identify a guide object in the vicinity of the detected current position, said plural guide search means each being dedicated to one of the different classifications, each of said guide search means searching exclusively within the classification to which each guide search means is dedicated; and guide information output means for outputting the guide information for the identified guide object.

8. A guide system according to claim 7 wherein said classifications are based upon size dimensions in a direction of travel of the vehicle, and wherein said plurality of guide search means search said classifications sequentially in the order of increasing size dimensions with output of guide information of objects of larger size dimensions being delayed or bypassed when output of guide information of identified guide objects of smaller size dimension prevent the output of guide information of the objects of larger size dimensions during a suitable period for output of the guide information of the objects of larger size dimensions.

9. A guide system according to claim 8 further comprising means for manually selecting one of said classifications for searching by the corresponding guide search means.

10. A guide system according to claim 8 wherein said classifications comprise a classification for point objects, a classification for linear objects and a classification for zone objects.

* * * * *